United States Patent
Korb et al.

(10) Patent No.: US 6,701,627 B2
(45) Date of Patent: Mar. 9, 2004

(54) COMPOSITE UTILITY KNIFE BLADE

(75) Inventors: William B. Korb, Melrose, CT (US); Brian K. Douglas, Enfield, CT (US)

(73) Assignee: American Saw & Mfg. Company, Inc., East Longmeadow, MA (US)

( * ) Notice: Subject to any disclaimer, the term of this patent is extended or adjusted under 35 U.S.C. 154(b) by 0 days.

(21) Appl. No.: 09/916,018

(22) Filed: Jul. 26, 2001

(65) Prior Publication Data

US 2003/0019111 A1 Jan. 30, 2003

(51) Int. Cl.$^7$ ............................ B26B 21/58; B21K 11/00
(52) U.S. Cl. ............................ 30/350; 30/351; 76/104.1
(58) Field of Search ....................... 30/2, 335, 346, 30/346.5, 346.53, 346.54, 346.55, 346.58, 346.61, 350, 351; 76/104.1

(56) References Cited

U.S. PATENT DOCUMENTS

| | | | |
|---|---|---|---|
| 882,413 A | 3/1908 | Parkison | |
| 1,732,244 A | 10/1929 | Salzman | |
| 1,734,554 A | * 11/1929 | Behrman | 76/104.1 |
| 2,093,874 A | 9/1937 | Stargardter | 76/104 |
| 3,279,283 A | 10/1966 | Craig | 76/104 |
| 3,315,548 A | 4/1967 | Anderson et al. | 76/112 |
| RE26,676 E | 9/1969 | Anderson et al. | 76/112 |
| 3,681,846 A | 8/1972 | Gerber | 30/355 |
| 3,911,579 A | 10/1975 | Lane et al. | 30/346.54 |
| 4,109,380 A | * 8/1978 | Anderson | 30/162 |
| 4,232,096 A | 11/1980 | Franzen et al. | 428/683 |
| 4,321,098 A | 3/1982 | Hayden | 148/14 |
| 4,896,424 A | 1/1990 | Walker | 30/349 |
| 5,091,264 A | 2/1992 | Daxelmueller et al. | |
| 5,142,785 A | 9/1992 | Grewal et al. | 30/32 |
| 5,317,938 A | 6/1994 | de Juan, Jr. et al. | 76/104.1 |
| 5,337,482 A | * 8/1994 | Schmidt | 30/351 |
| 5,417,777 A | 5/1995 | Henderer | |
| 5,613,300 A | * 3/1997 | Schmidt | 30/2 |
| 5,842,387 A | 12/1998 | Marcus et al. | 76/104.1 |
| 5,940,975 A | 8/1999 | Decker et al. | 30/346.54 |
| 6,105,261 A | 8/2000 | Ecer | 30/346.54 |

FOREIGN PATENT DOCUMENTS

| | | | |
|---|---|---|---|
| CA | 970661 | 7/1975 | ............ 143/71 |
| DE | 376421 | 5/1923 | |
| WO | WO98/38346 | 9/1998 | |

OTHER PUBLICATIONS

PCT/US02/23800, search report dated Sep. 26, 2002.*
Undated Product Catalog for Lutz KG, Solingen, Germany; pp. 3–20.
Undated Industrial/DIY Product Catalog, The Jewel Razor Company Ltd., Sheffield, England; pp. 2–5.
Product Catalog, American Safety Razor Company, Verona, Virginia; Jul., 1999; pp. 1–21.
Supplemental Price List, American Safety Razor Company, Verona, Virginia; 1998; pp. 1–2.
Undated Product Catalog, Mozart AG, Solingen, Germany; pp. 1–6 with inserts.
Undated Product Catalog, U.S. Blade Manufacturing Company, Cranford, New Jersey; pp. 1–11.

* cited by examiner

Primary Examiner—Hwei-Siu Payer
(74) Attorney, Agent, or Firm—McCarter & English, LLP

(57) ABSTRACT

A composite utility knife blade and method of making such a blade involves butt joining a tool steel wire to a front edge of an alloy steel backing strip. The wire is electron beam welded to the backing strip to form a composite strip defining a first metal portion formed by the alloy steel backing strip, a second metal portion formed by the tool steel wire, and a weld region joining the first and second metal portions. The composite strip is then annealed, and the annealed strip is straightened to eliminate any camber therein. The annealed composite strip is then hardened such that the first metal portion defines a surface hardness within the range of approximately 38 Rc to approximately 52 Rc, and the second metal portion defines a surface hardness within the range of approximately 60 Rc to approximately 57 Rc.

40 Claims, 7 Drawing Sheets

FIG. 7 ns to the manufacture of utility knife blades. For example, as described above, conventional

COMPOSITE UTILITY KNIFE BLADE

FIELD OF THE INVENTION

The present invention relates to utility knife blades, and more particularly, to composite utility knife blades wherein the outer cutting edge of the blade is made of a highly wear-resistant alloy, and a backing portion of the blade is made of an alloy selected for toughness, such as spring steel. The present disclosure also relates to methods of making such composite utility knife blades.

BACKGROUND INFORMATION

Conventional utility knife blades are made of carbon steel and define a back edge, a cutting edge located on an opposite side of the blade relative to the back edge, and two side edges located on opposite sides of the blade relative to each other and extending between the back and cutting edges of the blade. A pair of notches are typically formed in the back edge of the blade for engaging a locator in a blade holder. Typically, the back, cutting and side edges of the blade define an approximately trapezoidal peripheral configuration.

Conventional utility knife blades are manufactured by providing a carbon steel strip, running the strip through a punch press to punch the notches at axially spaced locations on the strip, and stamping a brand name, logo or other identification thereon. Then, the strip is scored to form a plurality of axially spaced score lines, wherein each score line corresponds to a side edge of a respective blade and defines a preferred breaking line for later snapping the scored strip into a plurality of blades. The punched and scored strip is then wound again into a coil, and the coil is hardened and tempered. The hardening and tempering operations may be performed in a "pit-type" vacuum furnace wherein the coils are repeatedly heated and cooled therein. Alternatively, the hardening and tempering operations may be performed "in-line", wherein the strip is unwound from the coil and successively driven through a series of furnaces and quenching stations to harden and temper the strip. The carbon steel strip is typically heat treated to a surface hardness of about 58 Rockwell "c" ("Rc"), and thus defines a relatively hard and brittle structure.

The heat treated strip is then ground, honed and stropped in a conventional manner to form the facets defining a straight cutting edge along one side of the strip. Then, the strip is snapped at each score line to, in turn, break the strip along the score lines and thereby form from the strip a plurality of trapezoidal shaped utility knife blades. Because the entire strip is relatively hard and brittle (about 58 Rc), the strip readily breaks at each score line to thereby form clean edges at the side of each blade.

One of the drawbacks associated with such conventional utility knife blades is that each blade is formed of a single material, typically carbon steel, that is heat treated to a relatively hard and brittle state, typically about 58 Rc. Thus, although such blades define a relatively hard, wear-resistant cutting edge, the entire blade is also relatively brittle, and therefore is subject to premature breaking or cracking in use. In addition, the cutting edges of such conventional blades are frequently not as wear resistant as might otherwise be desired. However, because the entire blade is made of the same material, any increase in hardness, and thus wear resistance of the cutting edge, would render the blade too brittle for practical use. As a result, such conventional utility knife blades are incapable of achieving both the desired wear resistance at the cutting edge, and overall toughness to prevent cracking or premature breakage during use. Another drawback of such convention utility knife blades is that the carbon steel typically used to make such blades corrodes relatively easily, thus requiring premature disposal of the blades and/or costly coatings to prevent such premature corrosion.

Certain prior art patents teach composite utility knife blades defining sandwiched, laminated, or coated constructions. For example, U.S. Pat. No. 4,896,424 to Walker shows a utility knife having a composite cutting blade formed by a body section 16 made of titanium, and a cutting edge section 18 made of high carbon stainless steel and connected to the body section by a dovetail joint 25.

U.S. Pat. Nos. 3,279,283, 2,093,874, 3,681,846, and 6,105,261 relate generally to laminated knives or razor blades having cutting edges formed by a core layer made of a high carbon steel or other relatively hard material, and one or more outer layers made of relatively softer materials. Similarly, U.S. Pat. Nos. 3,911,579, 5,142,785, and 5,940,975 relate to knives or razor blades formed by applying a relatively hard carbon coating (or diamond like coating ("DLC")) to a steel substrate. In addition, U.S. Pat. Nos. 5,317,938 and 5,842,387 relate to knives or razor blades made by etching a silicon substrate.

One of the drawbacks associated with these laminated, sandwiched and/or coated constructions, is that they are relatively expensive to manufacture, and therefore have not achieved widespread commercial use or acceptance in the utility knife blade field.

In stark contrast to the utility knife blade field, bi-metal band saw blades have been used in the saw industry for many years. For example, U.S. Reissue Pat. No. 26,676 shows a method of making bi-metal band saw blades wherein a steel backing strip and high speed steel wire are pre-treated by grinding and degreasing, and the wire is welded to the backing strip by electron beam welding. Then, the composite band stock is straightened and annealed. The sides of the annealed stock are then dressed, and the band saw blade teeth are formed in the high speed steel edge of the composite stock by milling. Then, the teeth are set and the resulting saw blade is heat treated. There are numerous methods known in the prior art for heat treating such band saw blades. For example, International Published Patent Application No. WO 98/38346 shows an apparatus and method for in-line hardening and tempering composite band saw blades wherein the blades are passed around rollers and driven repeatedly through the same tempering furnace and quenching zones. The heat treated composite band saw blades are then cleaned and packaged.

Although such bi-metal band saw blades have achieved widespread commercial use and acceptance over the past 30 years in the band saw blade industry, there is not believed to be any teaching or use in the prior art to manufacture utility knife blades defining a bi-metal or other composite construction as with bi-metal band saw blades. In addition, there are numerous obstacles preventing the application of such band saw blade technology to the manufacture of utility knife blades. For example, as described above, conventional utility knife blades are manufactured by forming score lines on the carbon steel strip, and then snapping the strip along the score lines to break the strip into the trapezoidal-shaped blades. However, the relatively tough, spring-like backing used, for example, to manufacture bi-metal band saw blades, cannot be scored and snapped. Rather, such relatively tough materials require different processes to form the utility knife blades from a heat treated, composite strip. In addition, the heat treating applied to conventional utility knife blades could not be used to heat treat bi-metal or other composite utility knife blades.

Accordingly, it is an object of the present disclosure to overcome one or more of the above-described drawbacks and disadvantages of prior art utility knife blades and/or methods of making such blades, and to provide a bi-metal or other composite utility knife blade defining a relatively hard; wear-resistant cutting edge, and a relatively tough, spring-like backing, and a method of making such utility knife blades.

SUMMARY OF THE INVENTION

The present invention is directed to a composite utility knife blade comprising a back edge, a cutting edge located on an opposite side of the blade relative to the back edge, and two side edges located on opposite sides of the blade relative to each other and extending between the back and cutting edges of the blade. Preferably, the back, cutting and side edges of the blade define an approximately trapezoidal peripheral configuration. The composite utility knife blade of the present invention further defines first and second metal portions, wherein the first metal portion extends between the back edge and the second metal portion, and further extends from approximately one side edge to the other side edge of the blade. The first metal portion is formed of an alloy steel heat treated to a hardness within the range of approximately 38 Rc to approximately 52 Rc. The second metal portion defines the cutting edge, and extends from approximately one side edge to the other side edge, and is formed of a high speed or tool steel heat treated to a hardness within the range of approximately 60 Rc to approximately 75 Rc. A weld region of the blade joins the first and second metal portions and extends from approximately one side edge to the other side edge of the blade.

In accordance with an alternative embodiment of the present invention, prior to hardening, the high speed or tool steel edge of the composite strip is cut, such as by punching, at the interface of each shear line and the second metal portion, to thereby separate the high speed steel cutting edges of adjacent composite utility knife blades formed from the composite strip. Then, during the die-cutting step, only the first metal portion of the hardened composite strip is die cut along the axially spaced shear lines to thereby form the plurality of utility knife blades from the composite strip. One advantage of the utility knife blades of the present invention is that they provide an extremely hard, wear-resistant cutting edge, and an extremely tough, spring-like backing, particularly in comparison to the conventional utility knife blades as described above. Thus, the utility knife blades of the present invention provide significantly improved blade life, and cutting performance throughout the blade life, in comparison to conventional utility knife blades. In addition, the utility knife blades, and method of making such blades, is relatively cost effective, particularly in comparison to the composite utility knife blades defining sandwiched, laminated and/or coated constructions, as also described above. As a result, the utility knife blades of the present invention provide a combination of wear resistance, toughness, cutting performance, and cost effectiveness heretofore believed to be commercially unavailable in utility knife blades.

Other objects and advantages of the present invention will become readily apparent in view of the following detailed description of preferred embodiments and accompanying drawings.

DETAILED DESCRIPTION OF THE PREFERRED EMBODIMENTS

Figures 1, 2:
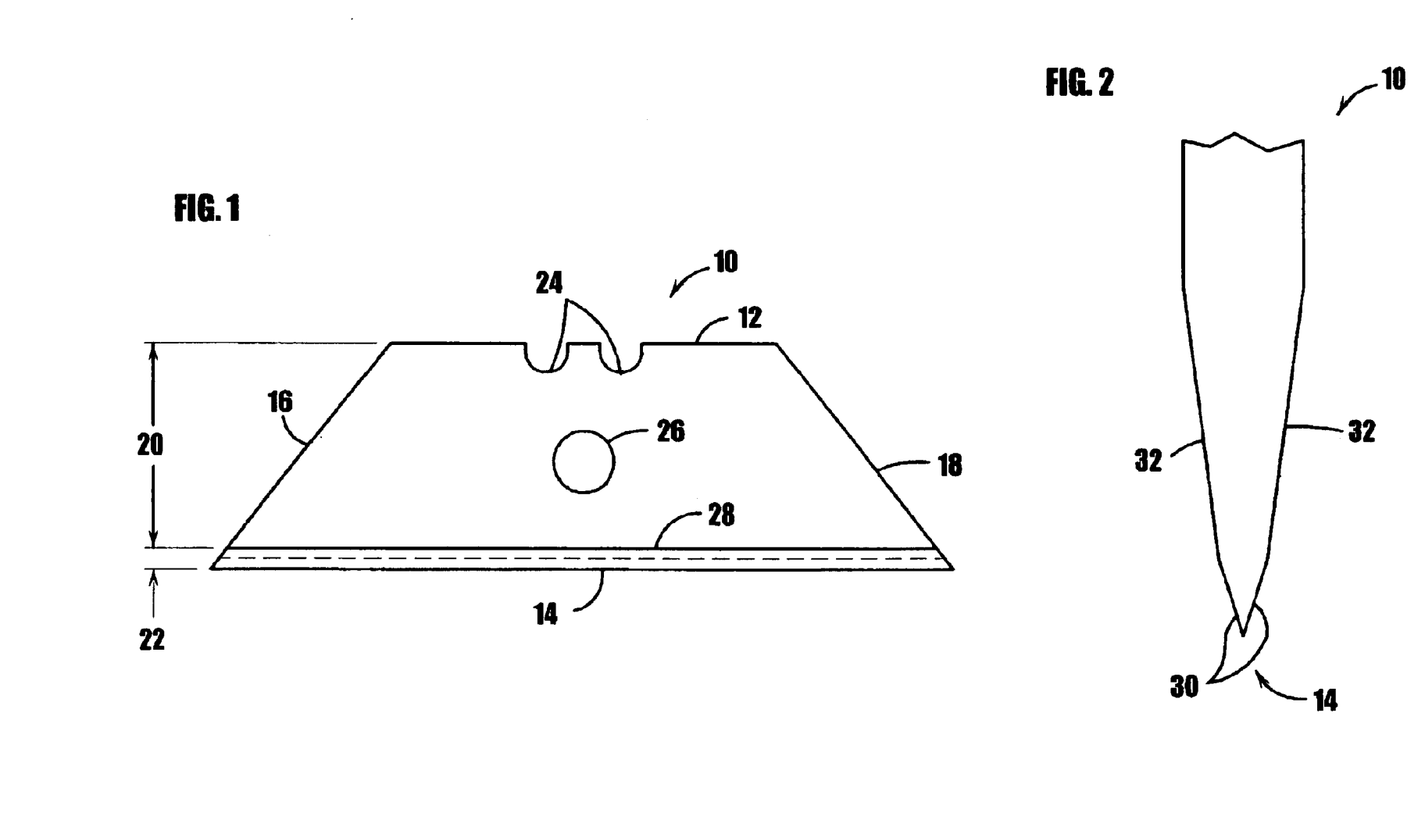
FIG. 1 is a top plan view of a composite utility knife blade embodying the present invention.
FIG. 2 is partial, end elevational view of the composite utility knife blade of FIG. 1 showing the multi-faceted cutting edge of the blade.

In FIG. 1, a composite utility knife blade embodying the present invention is indicated generally by the reference numeral 10. The utility knife blade 10 defines a back edge 12, a cutting edge 14 located on an opposite side of the blade relative to the back edge, and two side edges 16, 18 located on opposite sides of the blade relative to each other and extending between the back and cutting edges of the blade. As shown typically in FIG. 1, the back, cutting and side edges of the blade preferably define an approximately trapezoidal peripheral configuration.

The blade 10 further defines a first metal portion 20 and a second metal portion 22. As shown typically in FIG. 1, the first metal portion 20 extends between the back edge 12 and the first metal portion 22, and further extends from approximately one side edge 16 to the other side edge 18. In accordance with the present invention, the first metal portion 20 is formed of a steel, typically referred to as an "alloy" steel, that is heat treated to a surface hardness within the range of approximately 38 Rockwell "c" (referred to herein as "Rc") to approximately 52 Rc. The second metal portion 22 defines the cutting edge 14 and extends from approximately one side edge 16 to the other side edge 18. In accordance with the present invention, the second metal portion 22 is formed of a steel, typically referred to as a "high speed" or "tool" steel, that is heat treated to a surface hardness within the range of approximately 60 Rc to approximately 75 Rc.

The first metal portion 20 defines a spring-like backing that is relatively pliable, tough, and thus highly resistant to fatigue and cracking. The second metal portion 22, on the other hand, is relatively hard and highly wear resistant, and thus defines an ideal, long-lasting cutting blade. As a result, the composite utility knife blades of the present invention define highly wear-resistant, long-lasting cutting edges, combined with virtually unbreakable or shatter-proof backings. Thus, in stark contrast to the typical utility knife blades of the prior art, the composite utility knife blades of the present invention provide a cost-effective blade exhibiting both improved wear resistance and toughness heretofore commercially unavailable in such blades.

The first metal portion 20 of blade 10 is preferably made of any of numerous different grades of steel capable of being heat treated to a surface hardness within the preferred range of approximately 38 Rc to approximately 52 Rc, such as any of numerous different standard AISI grades, including 6135, 6150 and D6A. The second metal portion 22, on the other hand, is preferably made of any of numerous different types of wear-resistant steel capable of being heat treated to a surface hardness within the preferred range of approximately 60 Rc to approximately 75 Rc, such as any of numerous different standard AISI grades, including, without limitation, M Series grades, such as M1, M2, M3, M42, etc., A Series grades, such as A2, A6, A7 A9, etc., H Series grades, such as H10, H11, H12, H13, etc., and T Series grades, such as T1, T4, T8, etc.

As may be recognized by those skilled in the pertinent art based on the teachings herein, the currently preferred materials used to construct the first and second metal portions 20 and 22 and disclosed herein are only exemplary, and numerous other types of metals that are currently or later become known for performing the functions of the first and/or second metal portions may be equally employed to form the composite utility knife blades of the present invention.

As further shown in FIG. 1, each composite utility knife blade 10 defines a pair of cut outs or notches 24 formed in the back edge 12 and laterally spaced relative to each other. As shown typically in FIG. 1, each notch 24 defines a concave, approximately semi-circular profile, and is provided to engage a corresponding locator mounted within a blade holder (not shown) in order to retain the blade in the blade holder. As may be recognized by those skilled in the pertinent art based on the teachings herein, the notches 24 may take any of numerous different shapes and/or configurations, and the blade may include any number of such notches or other recesses that are currently or later become known to those skilled in the pertinent art for performing the function of engaging a blade holder, or the blade actuating mechanism or locator of such a holder.

As also shown in FIG. 1, the blade 10 further defines a registration aperture 26 extending through the first metal portion in an approximately central portion of the blade. As described further below, the registration aperture 26 is provided to receive a blade positioning device to position the blade in a die cutter during the process of making the blades in accordance with the present invention. As may be recognized by those skilled in the pertinent art based on the teachings herein, the aperture 26 may take any of numerous different shapes or configurations, and the blade may include any number of such apertures or other structural features for performing the function of properly positioning the blade in a die cutting or other manufacturing apparatus. In addition, the registration aperture(s) 26 may be located in any of numerous different locations on the utility knife blade, or may be located within the scrap material adjacent the blade and within the bi-metal strip from which the blade is formed.

As further shown in FIG. 1, the blade 10 defines a weld region 28 formed between the first and second metal portions 20 and 22, respectively, and defining an approximate line of joinder extending from one side edge 16 to the other side edge 18. As described in further detail below, the second metal portion is joined to the first metal portion 20 by applying thermal energy to the interface, such as by electron beam welding, to thereby weld the first metal portion to the second metal portion and form a resulting weld region defining a line of joinder between the two different metal portions.

As also shown in FIG. 1, the cutting edge 14 defines an approximately straight cutting edge extending from one side edge 16 to the other side edge 18. As shown in FIG. 2, the cutting edge 14 preferably defines first facets 30 located on opposite sides of the blade relative to each other, and second facets 32 spaced laterally inwardly and contiguous to the respective first facets 30. As shown typically in FIG. 2, the first facets 30 define a first included angle "A", and the second facets 32 define a second included angle "B". Preferably, the second included angle B is less than the first included angle A. In the currently preferred embodiment of the present invention, the first included angle A is approximately 26° and the second included angle B is approximately 18°. However, as may be recognized by those skilled in the pertinent art based on the teachings herein, these included angles are only exemplary and may be set as desired depending upon the physical properties and/or proposed applications of the blade. As may be further recognized by those skilled in the pertinent art, the utility knife blades of the present invention may include any number of facets.

Figure 3A:
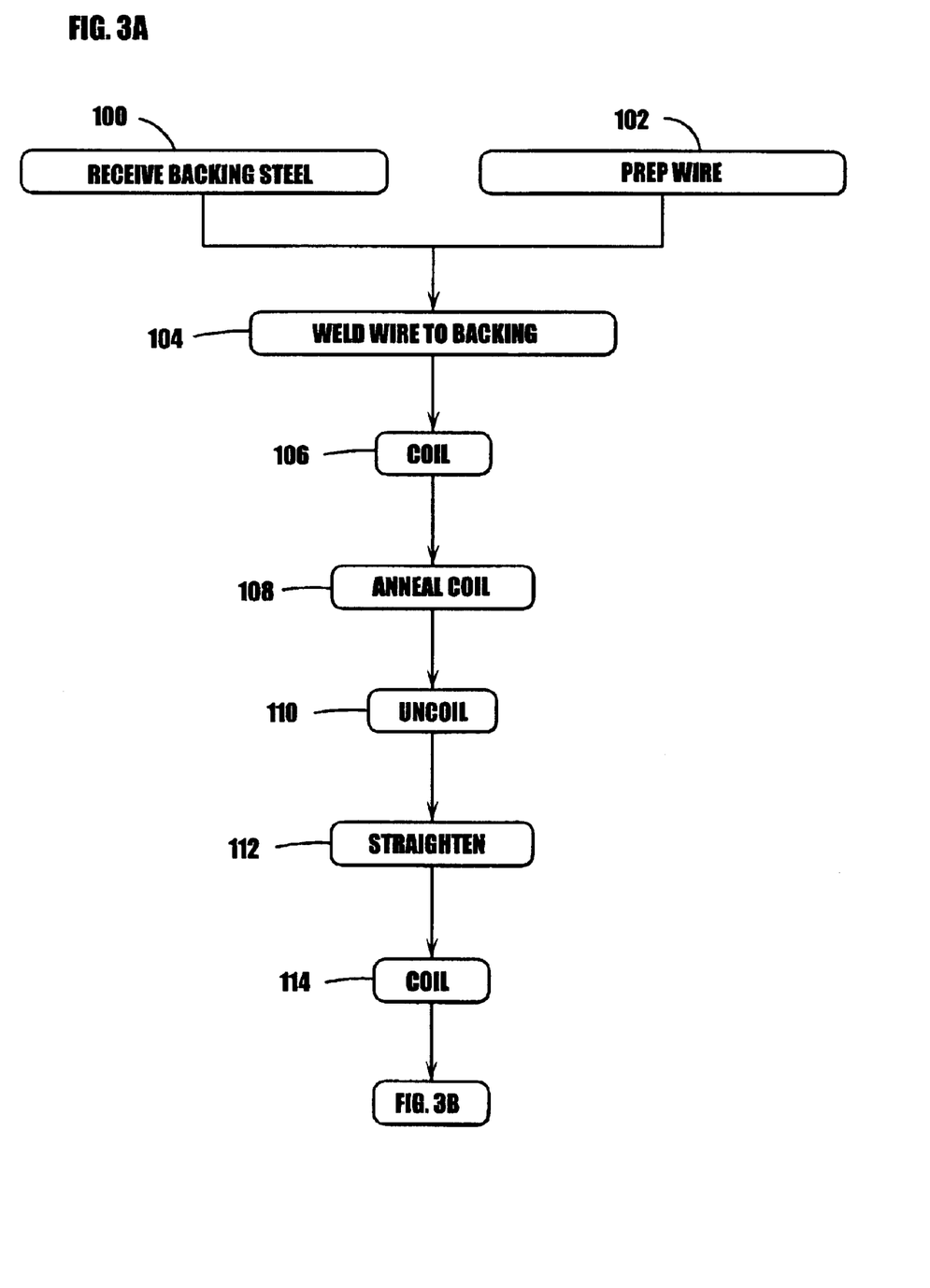
FIGS. 3A and 3B are flow charts illustrating conceptually the procedural steps involved in the method of making the composite utility knife blades of the present invention.
Figure 3B:
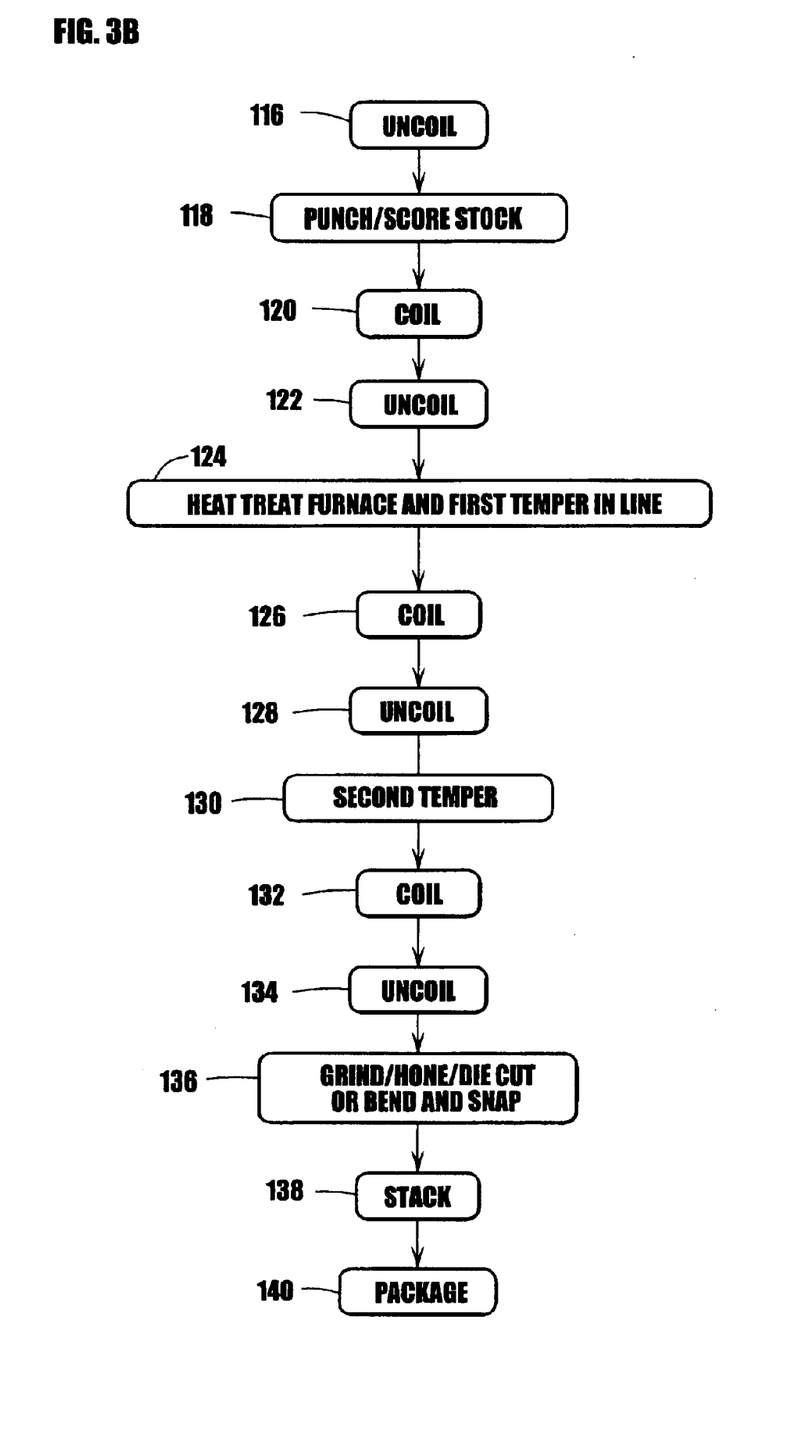
Figure 4:
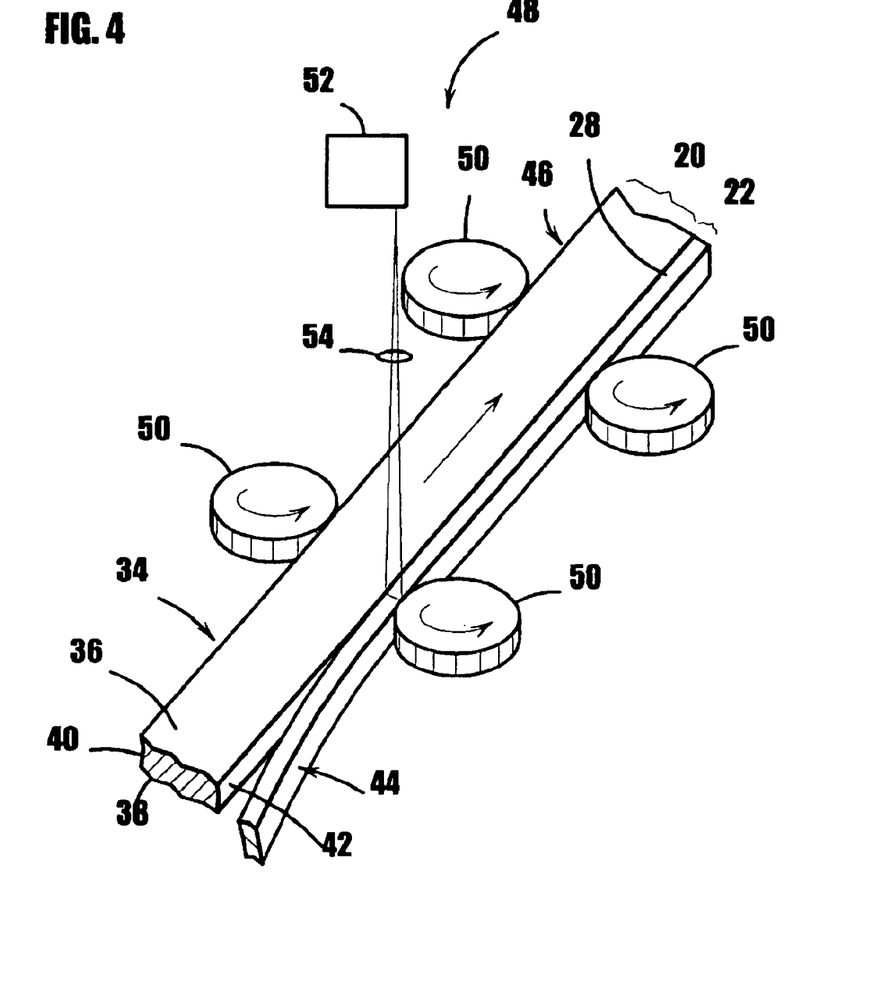
FIG. 4 is a somewhat schematic, perspective view of an apparatus for welding a high speed steel wire to a spring-steel backing to form bi-metal utility knife blades in accordance with certain embodiments of the present disclosure.

Turning to FIGS. 3A and 3B, the method of making the composite utility knife blades of the present invention is hereinafter described in further detail. As shown at steps 100 and 102, the backing steel forming the first metal portion 20 and the high speed or tool steel wire forming the second metal portion 22 are cleaned and otherwise prepared for welding in a manner known to those of ordinary skill in the pertinent art. As shown in FIG. 4, the backing steel is preferably provided in the form of one or more continuous elongated strips 34 wound into one or more coils. Each backing strip 34 defines an approximately planar upper side 36, an approximately planar lower side 38, and opposing back and front edges 40 and 42, respectively. Similarly, the high speed or tool steel wire is preferably provided in the form of one or more continuous lengths of wire 44 wound into one or more coils.

At step 104 of FIG. 3A, the high speed or tool steel wire 44 is butt joined to the front edge 42 of the backing strip 34, and thermal energy is applied to the interface between the wire and the backing strip to, in turn, weld the wire to the backing strip and form a bi-metal or composite strip 46 defining the first metal portion 20 formed by the steel backing strip 34, the second metal portion 22 formed by the high speed steel wire 44, and the weld region 28 joining the first and second metal portions. As shown in FIG. 4, a typical welding apparatus 48 includes opposing rollers 50 laterally spaced relative to each other for butt joining the high speed steel wire 44 to the front edge 42 of the backing strip 34, and rotatably driving the composite or bi-metal strip 46 through the welding apparatus. A thermal energy source 52 is mounted within the welding apparatus 48 and applies thermal energy to the interface of the high speed steel wire 44 and front edge 42 of the backing strip to weld the wire to the backing strip. In the currently preferred embodiment of the present invention, the thermal energy source 52 transmits an electron beam 54 onto the interface of the high speed steel wire and backing strip to electron beam weld the wire to the backing strip. However, as may be recognized by those skilled in the pertinent art based on the teachings herein, any of numerous other energy sources and/or joining methods that are currently or later become known for performing the functions of the electron beam welding apparatus may be equally employed in the method of the present disclosure.

For example, the energy source for welding the high speed steel wire to the backing strip may take the form of a laser or other energy source, and welding processes other than electron beam welding may be equally used.

As shown at step 106 of FIG. 3A, after welding the wire to the backing strip, the bi-metal strip 46 may then be coiled for annealing and/or for transporting the strip to an annealing station. As shown at step 108, the bi-metal strip 46 is annealed in a manner known to those of ordinary skill in the pertinent art. Typically, the bi-metal strips 46 are annealed in a vacuum furnace of a type known to those of ordinary skill in the pertinent art wherein a plurality of coils are vertically mounted relative to each other on a thermally conductive rack, and the rack is mounted in an evacuated furnace to soak the coils at a predetermined annealing temperature for a predetermined period of time. In the currently preferred embodiment of the present invention, the bi-metal strips 46 are annealed at a temperature within the range of approximately 1400° F. to approximately 1600° F. for up to approximately 5 hours. Then, the heated coils are allowed to cool at a predetermined rate in order to obtain the desired physical properties. For example, the coils may be cooled within the evacuated furnace initially at the rate of about 50° F. per hour until the coils reach approximately 1000° F., and then the coils may be allowed to cool at a more rapid rate. As may be recognized by those skilled in the pertinent art based on the teachings herein, these temperatures and times are only exemplary, however, and may be changed as desired depending upon any of numerous different factors, such as the particular materials, constructions and/or dimensions of the bi-metal strip 46, the type of welding process used to weld the wire to the backing, and/or the desired physical properties of the resulting blades.

After annealing, the bi-metal strip 46 is then uncoiled, if necessary, as shown at step 110, and the strip is straightened, as shown at step 112. After welding and annealing, the bi-metal strip 46 may develop a significant camber or other undesirable curvatures, and therefore such curvatures must be removed prior to further processing. In the currently preferred embodiment of the present invention, the bi-metal strip 46 is mechanically straightened by passing the strip through a series of pressurized rolls in a straightening apparatus of a type known to those of ordinary skill in the pertinent art, such as the Bruderer™ brand apparatus. However, as may be recognized by those skilled in the pertinent art based on the teachings herein, any of numerous straightening apparatus that are currently or later become known for performing the function of straightening metal articles like the bi-metal strip 46 may be equally employed. For example, as an alternative to the mechanical straightening apparatus, the bi-metal strip 46 may be straightened by applying heat and tension thereto in a manner known to those of ordinary skill in the pertinent art.

Figure 5:
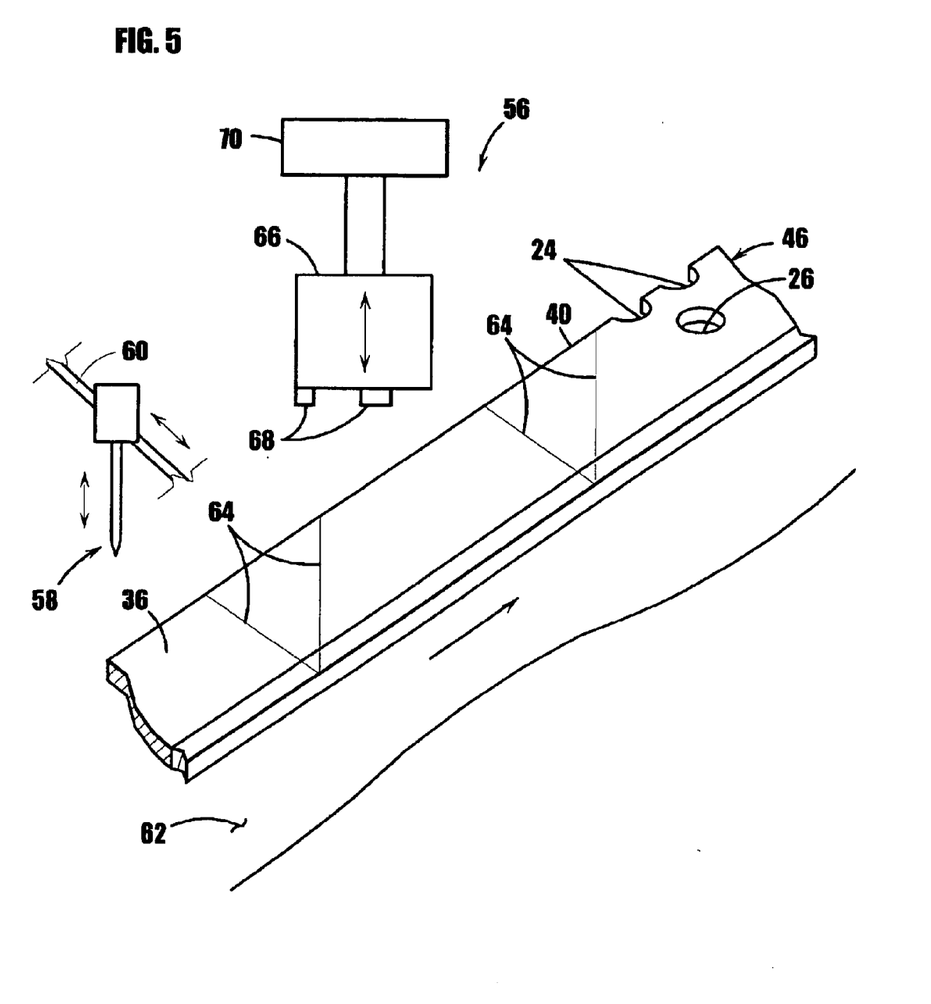
FIG. 5 is a somewhat schematic, perspective view of an apparatus for scoring and punching bi-metal strips in order to make bi-metal utility knife blades in accordance with one embodiment of the present disclosure.

As shown at step 114, the straightened bi-metal strip 46 may be coiled again, if necessary, for transportation and further processing. As shown at step 116 of FIG. 3B, the annealed and straightened bi-metal strip 46 is then uncoiled, if necessary. At step 118, the bi-metal strip is punched to form a plurality of notches or other cut outs 24 axially spaced relative to each other along the back edge 40 of the annealed bi-metal strip, and is scored to form a plurality of shear lines defining the side edges 16 and 18 of each blade. As shown in FIG. 5, a typical apparatus for performing the punching and scoring operations on the bi-metal strip 46 is indicated generally the reference numeral 56. The apparatus 56 includes a scoring instrument 58 mounted on a support 60 above a work support surface 62 supporting the bi-metal strip 46 thereon. As indicated by the arrows in FIG. 5, the scoring instrument is movable vertically into and out of engagement with the bi-metal strip, and is movable laterally relative to the strip. Thus, as shown typically in FIG. 5, the scoring tool 58 is controlled to engage the upper surface 36 of the bi-metal strip and move laterally across the strip to, in turn, score the upper surface of the strip and thereby form a plurality of score lines 64 axially spaced relative to each other on the strip and each defining a side edge 16 or 18 of a respective utility knife blade 10 (FIG. 1). The apparatus 56 further includes a punch 66 defining a plurality of cutting surfaces 68, each corresponding in shape and position to a respective notch 24 and aperture 26. As shown in FIG. 5, the punch 56 is drivingly connected to drive source 70, such as a hydraulic cylinder, and is movable into and out of engagement with the bi-metal strip seated on the work support surface 62 for cutting the notches 24 and aperture 26 in the bi-metal strip. As will be recognized by those of ordinary skill in the pertinent art based on the teachings herein, the scoring tool 58 and punch 66 may be computer-controlled to automatically drive the scoring tool and punch into and out of engagement with the bi-metal strip, and a driving mechanism (not shown) may be employed to automatically index the bi-metal strip relative to the scoring tool and punch. Similarly, the scoring tool and punch may be mounted in different apparatus or work stations than each other, and/or may each take the form of any of numerous other tools that are currently or later become known for either applying the score lines to the bi-metal strip, or cutting the notches and/or apertures in the bi-metal strip.

As shown at step 120 of FIG. 3B, the punched and scored bi-metal strip 46 may be coiled again, if necessary, for either temporary storage or transportation to the hardening and tempering stations. At step 122, the bi-metal strip is then uncoiled, if necessary, and at step 124, the uncoiled strip is hardened and tempered. As may be recognized by those of ordinary skill in the pertinent art based on the teachings herein, the hardening and tempering operations may be performed in accordance with any of numerous different hardening and tempering processes and apparatus that are currently known, or later become known for hardening and tempering articles like the bi-metal strip 46. In the currently preferred embodiment of the present invention, the bi-metal strip 46 is hardened at a temperature within the range of approximately 2000° F. to approximately 2200° F. for a hardening time period within the range of about 3 to about 5 minutes. Then, after hardening, the bi-metal strip is tempered within a first tempering cycle at a temperature within the range of approximately 1000° F. to approximately 1200° F. for a tempering time within the range of about 3 to about 5 minutes. After the first tempering cycle, the bi-metal strip is quenched by air cooling to room temperature. In the currently preferred embodiment of the present invention, the hardening and tempering cycles are performed "in-line" such that the bi-metal strip is continuously driven first through an elongated hardening furnace, then through a first elongated tempering furnace, then through a quenching station, and then through at least one more tempering furnace and quenching station. However, as may be recognized by those of ordinary skill in the pertinent art based on the teachings herein, the bi-metal strip may be repeatedly passed through the same tempering furnace and quenching station(s), and/or may be wound into coils and hardened, tempered and quenched in a "pit-type" or other furnace. In addition, the quenching may be an air quench as described herein, or may be an oil quench or other type of quench that is currently, or later becomes known for quenching tempered articles of the type disclosed herein. Similarly, the composite strip may be subjected to any number of tempering and quenching cycles as may be required in order to obtain the desired physical characteristics of the resulting blades.

At step 126, the tempered and quenched bi-metal strip 46 is coiled again, if necessary, for transportation to the next tempering station, and at step 128, the bi-metal strip is uncoiled for the second tempering cycle. As discussed above, these and other coiling and uncoiling steps can be eliminated by providing one or more in-line stations for processing the bi-metal strip. At step 130, the bi-metal strip is tempered again within a second tempering cycle at a temperature within the range of approximately 1000° F. to approximately 1200° F. for a tempering time within the range of about 3 to about 5 minutes. After the second tempering cycle, the bi-metal strip is quenched to room temperature. In the currently preferred embodiment, the quench is an air quench; however, as discussed above, this quench may take the form any of numerous other types of quenching processes that are currently or later become known for articles of the type disclosed herein. Then, at step 132 the tempered and quenched bi-metal strip is coiled again either for temporary storage and/or transportation to the grinding and punching stations.

At step 134, the annealed, hardened and tempered bi-metal strip 46 is uncoiled again, if necessary, and at 136, the bi-metal strip is subjected to grinding, honing, stropping, and die-cutting or bend and snap steps. More specifically, the bi-metal strip 46 is ground, honed and stropped in a manner known to those of ordinary skill in the pertinent art to form the facets 30 and 32 of FIG. 2, and thereby define a straight, high-speed or tool steel cutting edge along the side of the composite strip opposite the back edge of the first metal portion. Then, the ground, honed and stropped bi-metal strip 46 is die cut or bent and snapped along the score or shear lines 64 of FIG. 5 to thereby form a plurality of utility knife blades from the composite strip, wherein each utility knife blade defines an approximately trapezoidal peripheral configuration with the notches 24 and central aperture 26 formed therein, as shown typically in FIG. 1.

Figure 6:
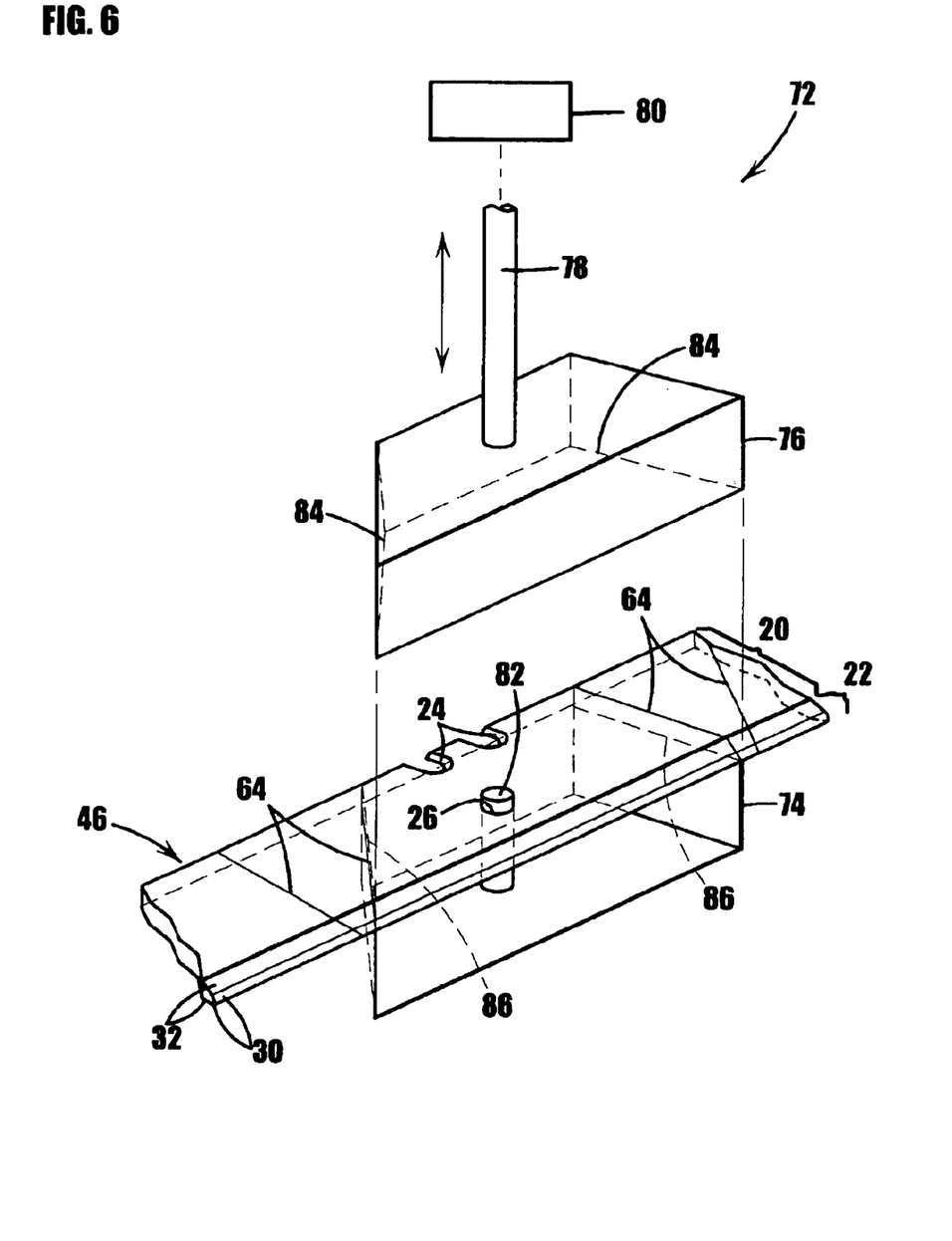
FIG. 6 is a somewhat schematic, perspective view of an apparatus for die cutting bi-metal strips in accordance with an embodiment of the present disclosure.

As shown in FIG. 6, a typical apparatus for die cutting the bi-metal strip is indicated generally by the reference numeral 72. The apparatus 72 comprises male and female dies 74 and 76, respectively, wherein the female die 76 is connected to a shaft 78 and the shaft is, in turn, drivingly connected to a hydraulic cylinder or like drive source 80 for moving the female die 78 into and out of engagement with the bi-metal strip 46 overlying the male die 74. The male die 74 includes a locator pin 82 projecting upwardly therefrom and received within the apertures 26 of the bi-metal strip to thereby properly locate the bi-metal strip between the male and female dies. As shown in phantom in FIG. 6, the female die 76 includes blade-like edges 84, and the male die 74 includes opposing blade-like edges 86 overlying and underlying respectively the shear lines 64 of the portion of the bi-metal strip 46 received between the dies. Then, in order to die cut the strip, the drive source 80 is actuated to drive the female die 76 downwardly and into engagement with the bi-metal strip such that the female and male blade-like edges 84 and 86, respectively, cooperate to shear the bi-metal strip along the shear lines and thereby form a respective utility knife blade embodying the present invention, as shown typically in FIG. 1. During this die-cutting operation, because of the relative hardness of the first and second metal portions 20 and 22, respectively, of the bi-metal strip, the strip is sheared by the blade-like edges along the score lines 64 within the first metal portion 20, and is snapped by the blade-like edges along the portions of the score lines within the relatively hard and brittle second portion 22. Thus, the score lines provide desired break lines (or a desired "crack path") within the relatively hard and brittle second metal portion, and therefore are important to providing clean and sharp edges in these regions of the blades.

In accordance with an alternative embodiment of the present invention, and as shown typically in FIG. 7, the bi-metal strip 46 may be punched prior to hardening at step 124 in order to avoid the need to later cut the relatively hard and brittle high speed steel edge at step 136, and thereby prevent any possible damage to the cutting edge 14 and facets 30 and 32 formed thereon that might otherwise occur during die-cutting. As shown typically in FIG. 7, an apparatus for punching the high-speed steel edge in accordance with the present invention is indicated generally by the reference numeral 88. The apparatus 88 includes a punch or like tool 90 mounted on a tool support 92 over a work support surface 94 for supporting the bi-metal strip 46 thereon. The tool support 92 is drivingly connected to a hydraulic cylinder or like drive source 96 for driving the punch 90 into and out of engagement with the high speed steel edge 14 of the bi-metal strip 46. As shown typically in FIG. 7, the punch 90 is shaped and configured to form a notch 98 at the interface of each score line 64 and the high speed steel edge or second metal portion 22. Thus, as shown typically in FIG. 7, each notch 98 extends along the respective score line at least throughout the second metal portion 22 of the score line to thereby separate the high speed steel portion of the respective blade from the remainder of the bi-metal strip at the score lines. Then, when the bi-metal strip 46 is die cut as shown in FIG. 6, the dies need only cut the first metal portion 20 of the strip along the score lines and need not die cut the high speed steel edge portions. As described above, the first metal portion 20 is relatively pliable and significantly less hard than the second metal portion 22, and therefore the first metal portion 20 may be easily and cleanly die cut along the score lines 64. After hardening, the second metal portion 22 may be relatively difficult to die cut because of the relative hardness and brittleness of this portion. However, prior to hardening, the high speed steel edge exhibits a surface hardness within the range of about 25 Rc, and therefore may be relatively easily and cleanly punched at this stage of the process. Accordingly, the alternative process and construction of FIG. 7 may facilitate the ability to avoid any damage to the hardened, high speed steel edge, that might otherwise occur when die cutting such edge.

Figure 7:
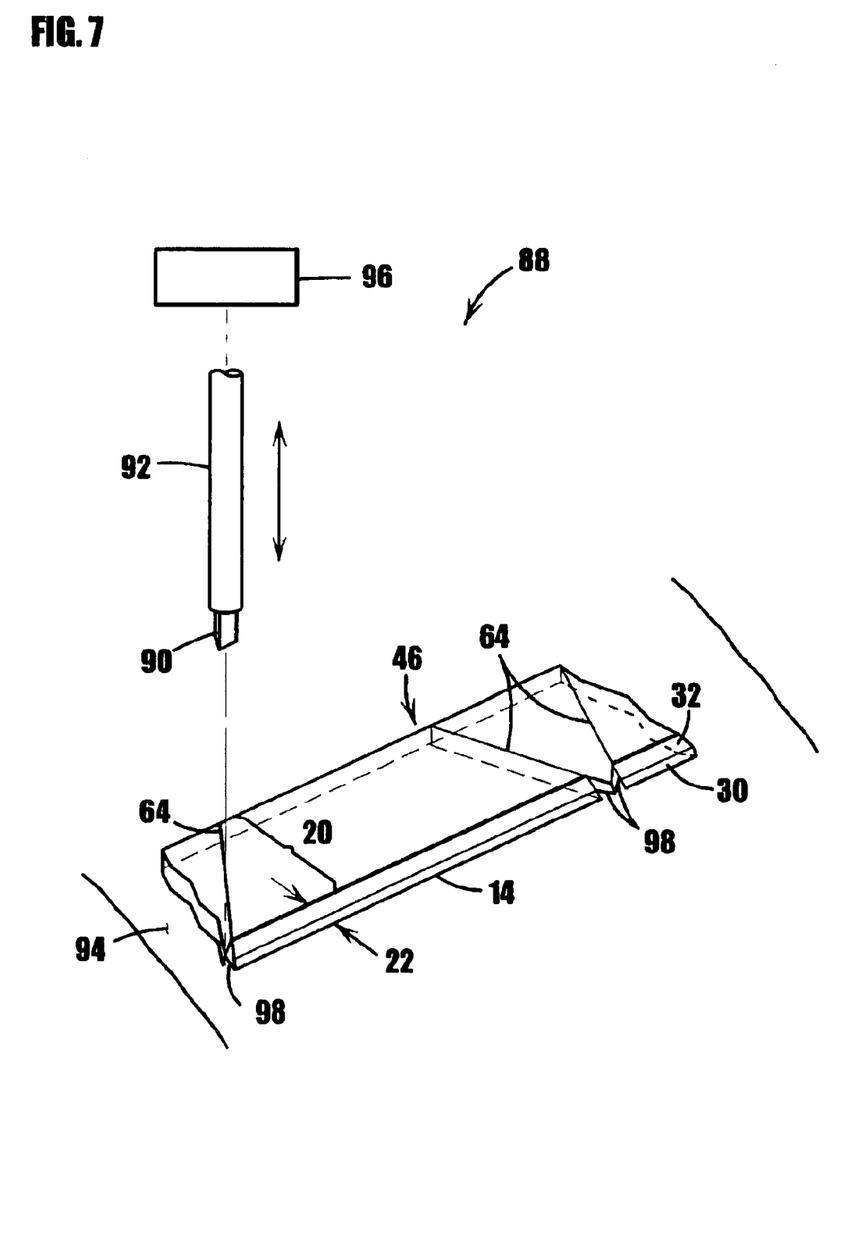
FIG. 7 is a somewhat schematic, perspective view of an apparatus for punching notches in the high-speed or tool steel edges of the bi-metal strips prior to hardening the strips in accordance with an embodiment of the present disclosure, and the resulting notched strip.

The notches 98 of FIG. 7 are shown as v-shaped notches. However, as may be recognized by those of ordinary skill in the pertinent art, these notches or cut outs may take any of numerous different shapes that may be required to separate the high speed steel edge portions of each blade from the remainder of the composite strip at the score or shear lines. As may be further recognized by those skilled in the pertinent art based on the teachings herein, it may be possible in the alternative embodiment of the present invention to eliminate the score lines because the score lines may be unnecessary in certain circumstances for purposes of die cutting the first metal portion 20 of the bi-metal strip.

Turning again to FIG. 3B, at step 138 the blades are stacked, and at step 140, the stacked blades are packaged in a manner known to those of ordinary skill in the pertinent art.

As may be recognized by those skilled in the pertinent art based on the teachings herein, numerous changes and modifications may be made to the above-described and other embodiments of the composite utility knife blades and the methods of making such blades of the present invention without departing from the scope of the invention as defined in the appended claims. For example, although the composite utility knife blades 10 illustrated herein define a bi-metal construction, the blades of the present invention may equally define a tri-metal or other composite construction. For example, the utility knife blades of the present invention may equally define high speed or tool steel cutting edges formed on opposite sides of the blade relative to each other, with a relatively tough, spring-like portion formed between the outer high speed or tool steel edges. Similarly, a tri-metal strip may be cut down the middle, or otherwise cut along an axially-extending line to form two bi-metal strips which each may, in turn, be cut to form the blades of the present invention. In addition, many, if not all, of the coiling and uncoiling steps shown in FIGS. 3A and 3B may be eliminated by employing in-line processing apparatus. Moreover, the blades need not necessarily define a trapezoidal peripheral configuration, but rather may define a rectangular or other peripheral configuration as desired or otherwise required by a particular tool or application. Accordingly, this detailed description of preferred embodiments is to be taken in an illustrative, as opposed to a limiting sense.

What is claimed is:

1. A composite utility knife blade, comprising:
    a back edge, a cutting edge located on an opposite side of the blade relative to the back edge, and two side edges located on opposite sides of the blade relative to each other and extending between the back and cutting edges of the blade, wherein the back, cutting and side edges of the blade define an approximately trapezoidal peripheral configuration;
    first and second metal portions, wherein the first metal portion extends between the back edge and the second metal portion, and extends from approximately one side edge to the other side edge, and is formed of a steel heat treated to a hardness within the range of approximately 38 Rc to approximately 52 Rc, and the second metal portion defines the cutting edge and extends from approximately one side edge to the other side edge, and is formed of a tool steel heat treated to a hardness within the range of approximately 60 Rc to approximately 75 Rc; and
    a weld region joining the first and second metal portions and extending from approximately one side edge to the other side edge of the blade.

2. A composite utility knife blade as defined in claim 1, wherein the second metal portion consists essentially of tool steel.

3. A composite utility knife blade as defined in claim 1, wherein the second metal portion is formed of tool steel selected from the group including: M series, A series, H series and T series steels.

4. A composite utility knife blade as defined in claim 1, wherein the first metal portion is formed of steel selected from the group including 6135, 6150 and D6A.

5. A composite utility knife blade as defined in claim 1, further defining at least one notch formed in the back edge.

6. A composite utility knife blade as defined in claim 5, further defining two notches formed in the back edge and laterally spaced relative to each other.

7. A composite utility knife blade as defined in claim 1, further defining a registration aperture extending through the first metal portion.

8. A composite utility knife blade as defined in claim 1, wherein the cutting edge defines an approximately straight edge extending from approximately one side edge of the blade to die other side edge, and at least two facets formed on opposite sides of the blade relative to each other.

9. A composite utility knife blade as defined in claim 1, wherein the interface of the first and second metal portions defines a butt joint forming an approximate line of joinder within the weld region.

10. A composite utility knife blade as defined in claim 1, wherein the second metal portion is formed by a tool steel wire extending from approximately one side edge to the other side edge of te blade, the tool steel wire being welded to the first metal portion throughout the weld region and including at least one ground surface defining the cutting edge of the blade.

11. A composite utility knife blade as defined in claim 10, wherein the first metal portion is formed by a steel sheet defining an approximately planar first side, an approximately planar second side opposite the first side, and back and front edges extending between the first and second sides and located on opposite sides of the first metal portion relative to each other, and wherein the tool steel wire is welded to the front edge of the first metal portion throughout the weld region.

12. A composite utility knife blade as defined in claim 11, wherein the steel sheet is formed of spring steel.

13. A composite utility knife blade as defined in claim 11, wherein the blade is shatter-proof.

14. A plurality of composite utility knife blades as defined in claim 1, wherein the plurality of blades are formed integral with each other in a strip, the back edge of each blade is defined by a first edge of the strip, the cutting edge of each blade is defined by a second edge of the strip, and the side edges of each blade are defined by shear lines axially spaced relative to each other on the strip and extending between the first and second edges of the strip.

15. A plurality of composite utility knife blades as defined in claim 14, wherein the strip forming the plurality of blades further defines a plurality of notches axially spaced relative to each other along the second edge, and each notch is formed at the interface of a respective shear line and second metal portion.

16. A plurality of composite utility knife blades as defined in claim 15, wherein each sheer line is defined by a respective score line.

17. A plurality of composite utility knife blades as defined in claim 15, wherein each notch extends laterally at least throughout the second metal portion.

18. A plurality of composite utility knife blades as defined in claim 1, wherein the plurality of blades are formed integral with each other in a composite strip, the back edge of each blade is defined by a first edge of the strip, the cutting edge of each blade is defined by a second edge of the strip opposite the first edge of the strip, a plurality of indentations are axially spaced relative to each other along the second edge of the strip, and each indentation extends laterally into the second edge of the strip.

19. A plurality of composite utility knife blades as defined in claim 18, wherein each indentation forms a portion of a side edge of a respective blade.

20. A plurality of composite utility knife blades as defined in claim 18, wherein each indentation defines an approximately v-shaped notch.

21. A plurality of composite utility knife blades as defined in claim 18, wherein the composite strip further defines a plurality of score lines axially spaced relative to each other and extending between the first and second edges of the strip, and each indentation is formed at the juncture of a respective score line and second metal portion.

22. A composite utility knife blade as defined in claim 1, wherein the composite utility knife blade is made in accordance with the following steps:

providing an elongated tool steel wire, and an elongated backing strip formed of steel and defining an approximately planar upper side, an approximately planar lower side, and opposing back and front edges extending between the upper and lower sides;

butt joining the tool steel wire to the front edge of the steel backing strip;

applying thermal energy to the interface between the tool steel wire and the steel backing strip to weld the tool steel wire to the steel backing strip and, in turn, forming a composite strip defining the first metal portion formed by the steel backing strip, the second metal portion formed by the tool steel wire, and the weld region joining the first and second metal portions;

forming at least one facet into the second metal portion and, in turn, forming an approximately straight tool steel cutting edge along the side of the composite strip opposite the back edge of the first metal portion; and die cutting at least one of the first and second metal portions along shear lines axially spaced relative to each other, wherein each shear line is oriented at an acute angle relative to the back edge of the first metal portion, to thereby form a plurality of utility knife blades from the composite strip.

23. A composite utility knife blade as defined in claim 22, wherein the composite utility knife blade is made in accordance with the following additional steps:

annealing the composite strip;

straightening the annealed composite strip;

hardening the annealed composite strip;

tempering the hardened composite strip; and quenching the hardened composite strip.

24. A composite utility knife blade as defined in claim 22, wherein the composite utility knife blade is made in accordance with the additional step of scoring the composite strip at axially spaced locations to form the shear lines.

25. A composite utility knife blade as defined in claim 22, wherein the composite utility knife blade is made in accordance with the following additional steps:

cutting indentations in the tool steel edge of the composite strip at the interface of each shear line and the second metal portion to thereby separate with the indentations the tool steel cutting edges of adjacent composite utility knife blades formed from the composite strip;

hardening the composite strip; and then die-cutting only the first metal portion of the hardened composite strip along the axially spaced shear lines to thereby form the plurality of utility knife blades from the composite strip.

26. A composite utility knife blade as defined in claim 25, wherein the step of cutting the tool steel edges includes punching a notch at the interface of each shear line and the second metal portion.

27. A composite utility knife blade, comprising:

a back edge, a cutting edge located on an opposite side of the blade relative to the back edge, and two side edges located on opposite sides of the blade relative to each other and extending between the back and cutting edges of the blade, wherein the back, cutting and side edges of the blade define an approximately trapezoidal peripheral configuration;

first means for forming the cutting edge and defining a hardness within the range of approximately 60 Rc to approximately 75 Rc, said first means extending from approximately one side edge to the other side edge;

second means for forming a backing to the first means and defining a hardness within the range of approximately 38 Rc to approximately 52 Rc, said second means extending between the back edge and the first means and extending from approximately one side edge to the other side edge; and a weld region joining the first and second means and extending from approximately one side edge to the other side edge of the blade.

28. A composite utility knife blade as defined in claim 27, wherein the interface of the first and second means defines a butt joint forming an approximate line of joinder within the weld region.

29. A composite utility knife blade as defined in claim 27, wherein the cutting edge formed by the first means is an approximately straight cutting edge extending from approximately one side edge of the blade to the other side edge.

30. A composite utility knife blade as defined in claim 29, wherein the cutting edge defines at least two facets located on opposite sides of the blade relative to each other.

31. A composite utility knife blade as defined in claim 27, wherein the first means is formed of a tool steel wire welded to the second means and heat treated to a hardness within the range of approximately 60 Rc to approximately 75 Rc.

32. A composite utility knife blade as defined in claim 27, wherein the second means is formed of a steel strip welded to the first means and heat treated to a hardness within the range of approximately 38 Rc to approximately 52 Rc.

33. A composite utility knife blade as defined in claim 27, wherein the second means defines at least one notch formed in the back edge.

34. A composite utility knife blade as defined in claim 27, wherein the first means is formed by a tool steel wire including at least one ground surface defining the cutting edge of the blade, and wherein the tool steel wire extends from approximately one side edge to the other side edge of the blade and is welded to the second means throughout the weld region of the blade.

35. A composite utility knife blade as defined in claim 34, wherein the second means is formed by a steel sheet defining an approximately planar first side, an approximately planar second side opposite the first side, and back and front edges extending between the first and second sides and located on opposite sides of the second means relative to each other, and wherein the tool steel wire is welded to the front edge of the second means throughout the weld region.

36. A composite utility knife blade as defined in claim 35, wherein the steel sheet is formed of spring steel.

37. A composite utility knife blade as defined in claim 35, wherein the blade is shatter-proof.

38. A plurality of composite utility knife blades as defined in claim 27, wherein the plurality of blades are formed integral with each other in a composite strip, the back edge of each blade is defined by a first edge of the strip, the cutting edge of each blade is defined by a second edge of the strip opposite the first edge of the strip, a plurality of indentations are axially spaced relative to each other along the second edge of the strip, and each indentation extends laterally into the second edge of the strip.

39. A plurality of composite utility knife blades as defined in claim 38, wherein each indentation forms a portion of a side edge of a respective blade.

40. A plurality of composite utility knife blades as defined in claim 38, wherein the composite strip further defines a plurality of score lines axially spaced relative to each other and extending between the first and second edges of the strip, and each indentation is formed at the juncture of a respective score line and first means.

* * * * *

UNITED STATES PATENT AND TRADEMARK OFFICE
CERTIFICATE OF CORRECTION

| | | |
|---|---|---|
| PATENT NO. | : 6,701,627 B2 | |
| APPLICATION NO. | : 09/916018 | |
| DATED | : March 9, 2004 | |
| INVENTOR(S) | : Korb et al. | |

It is certified that error appears in the above-identified patent and that said Letters Patent is hereby corrected as shown below:

In column 2, line 3, delete the word "convention" and replace it with the word --conventional--.

In column 12, line 39, delete the word "sheer" and replace it with the word --shear--.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,701,627 B2 Page 1 of 1
APPLICATION NO. : 09/916018
DATED : March 9, 2004
INVENTOR(S) : Korb et al.

It is certified that error appears in the above-identified patent and that said Letters Patent is hereby corrected as shown below:

In column 2, line 3, delete the word "convention" and replace it with the word --conventional--.

In column 12, line 39, delete the word "sheer" and replace it with the word --shear--.

Signed and Sealed this

Twenty-eighth Day of November, 2006

JON W. DUDAS
*Director of the United States Patent and Trademark Office*